Patented July 19, 1938

2,124,388

UNITED STATES PATENT OFFICE 2,124,388

MANUFACTURE OF FORMALDEHYDE

John Morris Weiss, New York, and Charles Raymond Downs, Yonkers, N. Y., assignors to Bakelite Corporation, New York, N. Y., a corporation of Delaware No Drawing. Application November 12, 1926, Serial No. 148,097

5 Claims. (Cl. 260—138)

This invention is concerned with improvements in the manufacture of formaldehyde from methyl alcohol by oxidizing the methyl alcohol with oxygen or oxygen-containing gases in the presence of a metallic oxide catalyst. The reaction is carried on in the vapor phase and usually with a considerable excess of oxygen over that theoretically required for the reaction.

$$2CH_3OH + O_2 = 2HCHO + 2H_2O$$

We are aware of the fact that vanadium oxide has been proposed and used for this reaction but the use of a vanadium oxide catalyst is not thoroughly satisfactory owing to the fact that a substantial amount of formic acid is produced and the acidity is sufficient to cause a condensation of the formaldehyde in part to acetal, thereby lowering the yield and contaminating the product. In our work we have endeavored to obtain catalysts free from such disadvantages and have discovered that mixtures of oxides of vanadium and molybdenum, mixtures of oxides of vanadium, molybdenum and uranium, mixtures of oxides of molybdenum and uranium and in general mixtures of oxides of vanadium and one or more metals of the sixth group of the periodic system, act effectively as catalysts for the production of formaldehyde from methyl alcohol and, moreover, do not form the excessive amounts of formic acid which are produced when vanadium oxide is used alone. As examples of mixtures of oxides which have been found effective, the following may be cited although we do not intend to limit ourselves by the examples given and it must be understood that the proportions may vary widely without departing from the spirit and scope of the invention.

*Example I*

|  | Percent |
|---|---|
| Uranium oxide ($UO_3$) | 89 |
| Molybdenum oxide ($MoO_3$) | 11 |

*Example II*

|  | Percent |
|---|---|
| Vanadium oxide ($V_2O_5$) | 60 |
| Molybdenum oxide ($MoO_3$) | 40 |

*Example III*

|  | Percent |
|---|---|
| Vanadium oxide ($V_2O_5$) | 50 |
| Uranium oxide ($UO_3$) | 10 |
| Molybdenum oxide ($MoO_3$) | 40 |

We have expressed catalyst composition in terms of the higher oxides of the metals for the sake of convenience but in actual practice under the reducing effect of methyl alcohol during the reaction, varying amounts of lower oxides exist in the catalytic mass. The oxide catalysts may be used without a carrier or as coatings on suitable carriers such as grained aluminum.

In use the catalyst is placed in an apparatus with suitable means for removing the reaction heat and a mixture of air or other oxygen-containing gas with methyl alcohol passed over it, the products of reaction, i. e., formaldehyde and unchanged methyl alcohol being thereafter condensed and recovered.

The process is operable when working under the conditions, including temperature, time, concentration of vaporized alcohol in the mixture undergoing reaction, etc., already known in the art of catalytic oxidation of primary aliphatic alcohols.

We claim:

1. The process of producing formaldehyde, which comprises passing a mixture of methyl alcohol in the vapor phase and an oxygen-containing gas into contact with a catalyst mass consisting chiefly of a mixture of vanadium and molybdenum oxides in substantially equimolecular proportions and each amounting to at least 40% of the catalyst mixture.

2. The process of producing formaldehyde, comprising passing a mixture of methyl alcohol in the vapor phase and an oxygen-containing gas into contact with a catalyst consisting of a substantially equimolecular mixture of vanadium and molybdenum oxides.

3. The process of producing formaldehyde, comprising passing a mixture of methyl alcohol in the vapor phase and air into contact with a catalyst consisting of a substantially equimolecular mixture of vanadium and molybdenum oxides.

4. The process defined in claim 1, characterized in that the catalyst mass consists of a mixture of vanadium, molybdenum and uranium oxides in the following approximate proportions

|  | Percent |
|---|---|
| Vanadium oxide | 50 |
| Molybdenum oxide | 40 |
| Uranium oxide | 10 |

5. In the process of producing formaldehyde by the catalytic oxidation of methyl alcohol, the improvement which comprises passing vapors of methyl alcohol and an oxygen-containing gas into contact with a catalyst mixture comprising a predominating proportion of a mixture of vanadium oxide and at least one of the oxides of molybdenum and uranium, the latter being present in the mixture in a smaller amount than the vanadium oxide but in an amount sufficient substantially to depress simultaneous formation of formic acid in the carrying out of the oxidation process.

JOHN MORRIS WEISS.
CHARLES R. DOWNS.